INVENTORS
William E. Owens
John R. Owens
BY Bailey, Stephens and Huettig
ATTORNEYS

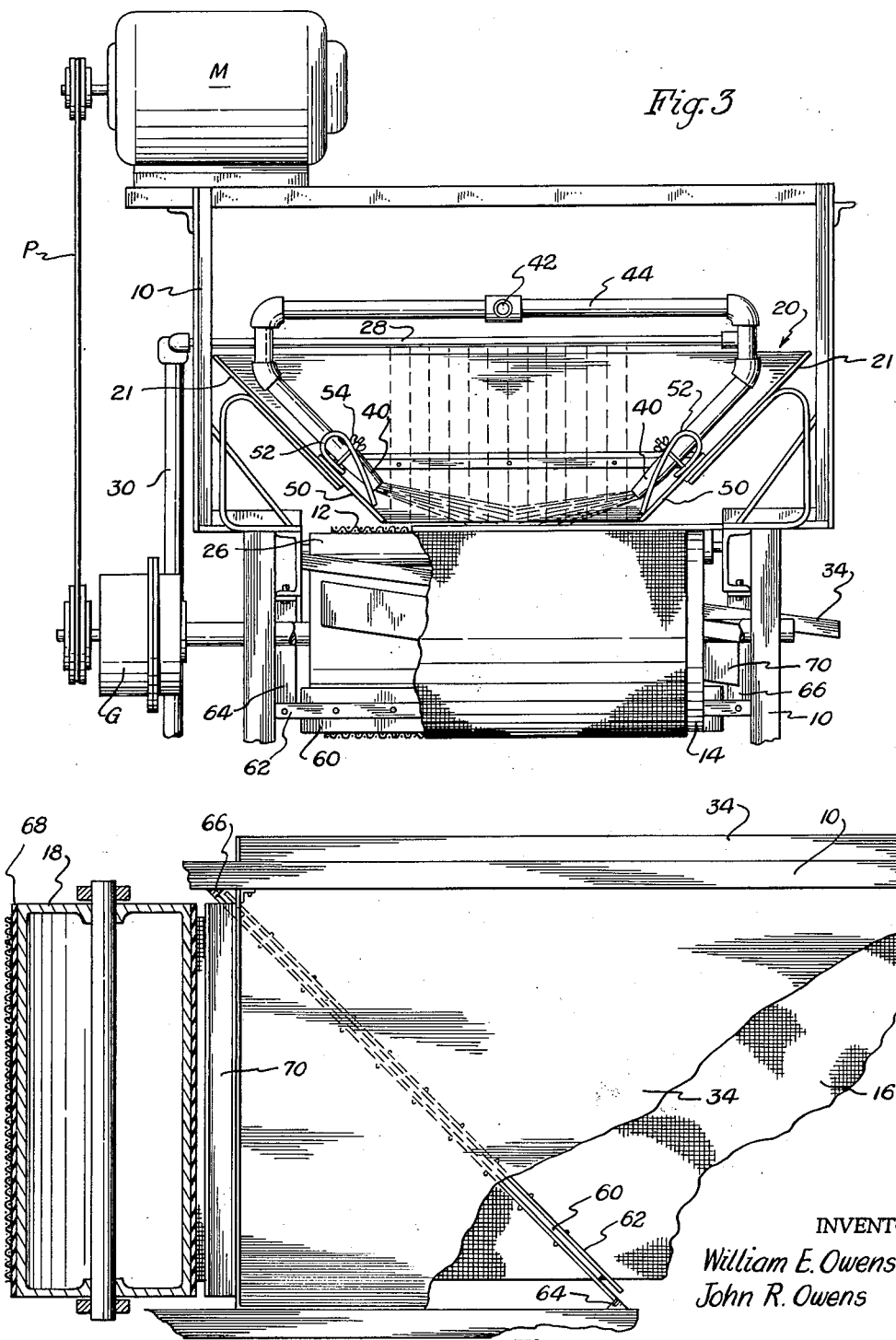

United States Patent Office 3,261,368
Patented July 19, 1966

3,261,368
STONE WASHER
William E. Owens and John R. Owens, both of Dixie Freeway at Smith St., P.O. Box 508, New Smyrna Beach, Fla.
Filed Feb. 17, 1964, Ser. No. 345,374
5 Claims. (Cl. 134—104)

This invention relates to a machine for washing stones and, in particular, to a machine for recovering coarse aggregate from unset and unused concrete.

Concrete mixing trucks returning from a job to the materials storage plant often carry back concrete which was not needed at the job site. This concrete must be dumped before the truck can be loaded with a new concrete mix. Ordinarily the unused and unset concrete is dumped from the truck as complete waste, for there is little or no use for it. Previous attempts have been made to salvage at least the coarse aggregate by the use of machines for washing the hydraulic cement and sand from the stones or gravel. However, the heretofore used machines have been so expensive to construct and maintain, and they operated so slowly as to make the attempted recovery of the coarse aggregate uneconomical.

The object of this invention is to produce a machine for washing stone so that at least the coarse aggregate can be recovered from unset hydraulic cement concrete at a cost below the salvage value of the concrete.

Another object is to produce a stone washing machine which will receive and wash the concrete aggregate as fast as it can be dumped from a truck, and which does not need extra manual help to operate the machine.

In general, these objects are obtained by making a machine having an endless open mesh conveyor belt which moves continuously as the waste unset concrete is dumped on it from the concrete mixing truck. Trough means are provided for keeping the material on the upper reach of the belt, together with means for spreading the material evenly in the trough. A series of spray nozzles is used to quickly wash the sand and hydraulic cement from the stones as they are conveyed on the upper reach of the belt. Scrapers and other means are used to remove stones caught in the meshes on the lower reach of the belt so that the belt is kept clean and protected from damage which would be caused by unremoved stones.

Figure 1:
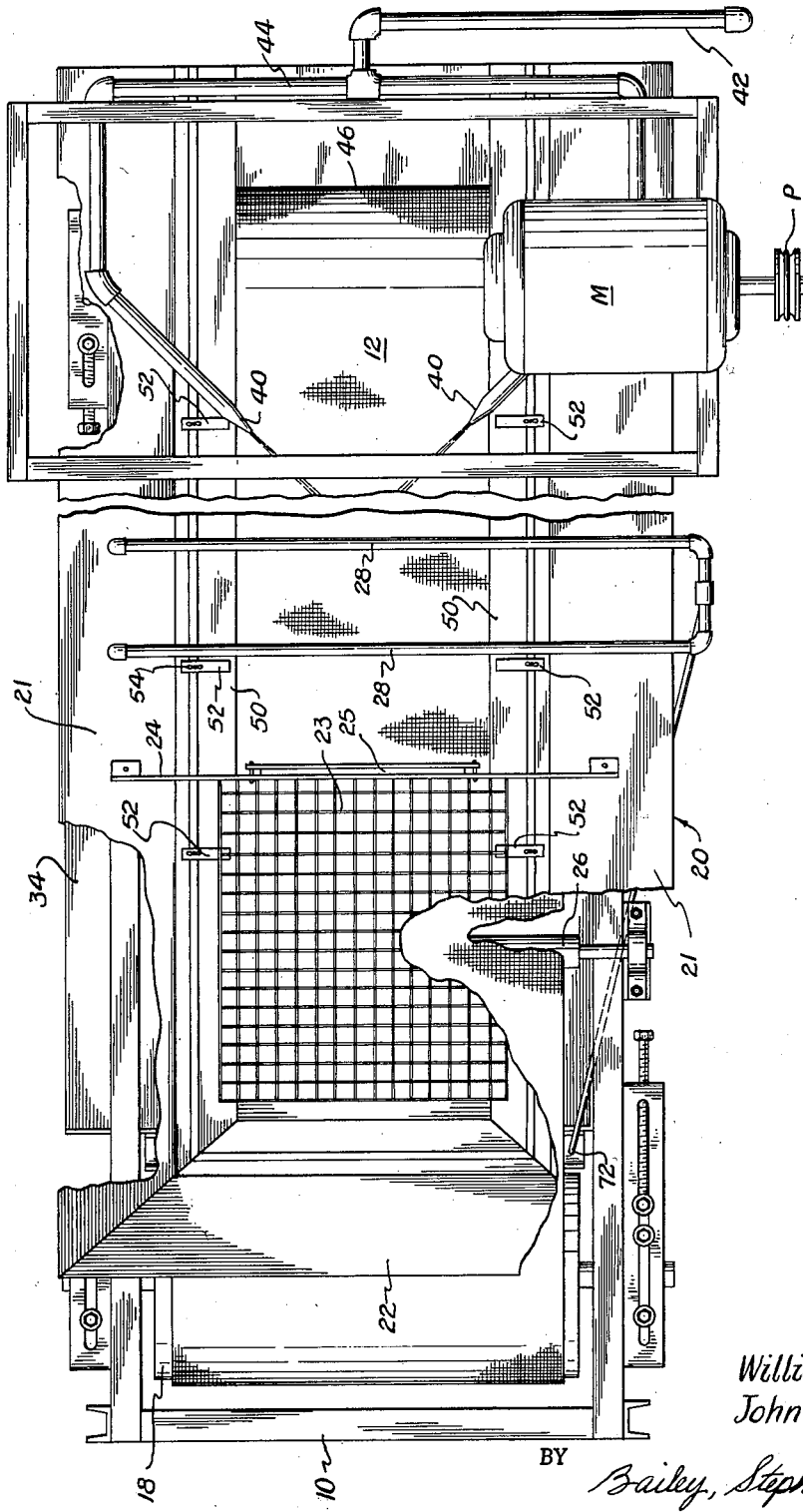
Figure 2:
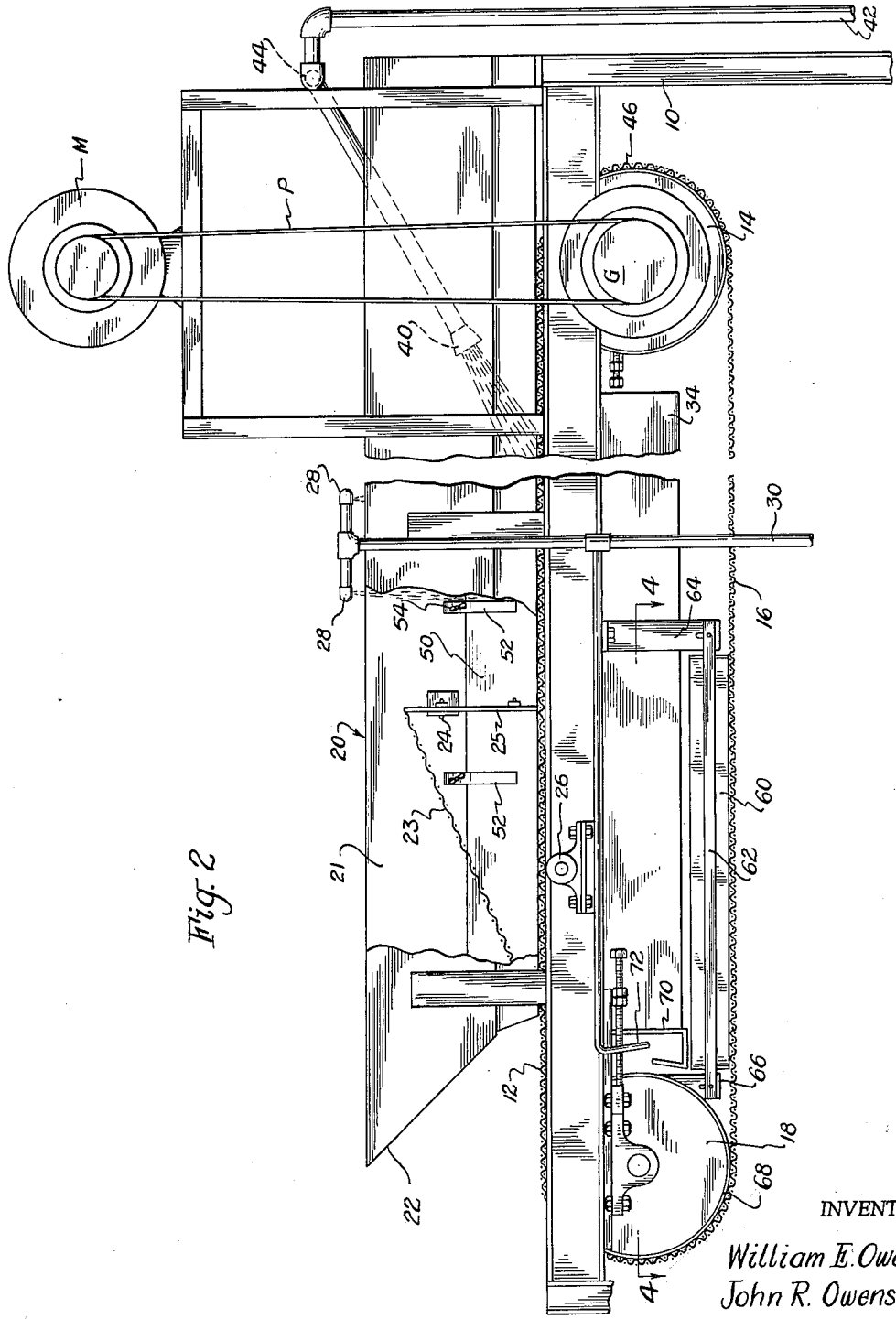

The means by which the objects of the invention are obtained are disclosed more fully with reference to the accompanying drawings in which:

FIGURE 1 is a top plan view of the stone washing machine, partly shown in section;
FIGURE 2 is a side elevational view of FIGURE 1, partly shown in section;
FIGURE 3 is an end view of FIGURE 2; and
FIGURE 4 is a cross-sectional view taken on the line 4—4 of FIGURE 2.

The stone washing machine is mounted on a rectangular frame work 10. An open mesh wire endless conveyor belt has an upper reach 12 which passes over a cylindrical drive roller 14 at the stone discharge end of the machine and is continued in a lower reach 16 to a belt return cylindrical roller 18 at the material inlet end of the machine. Mounted above the upper reach 12 is a trough 20 having side walls 21 downwardly and inwardly inclined toward the center portion of the upper reach 12, and having a closed hopper-like material or stone receiving end 22. As shown in FIGURES 1 and 3, the material discharge end of the upper reach is open and not confined by a wall of trough 20.

Within the trough 20 and at the material receiving end 22 is a rigid sheet of wire mesh or grid 23 having large openings as, for example, in the order of 1½" x 1½", inclined at an angle of about 30°, and having its upper end supported by a beam 24 secured to each side wall of trough 20. The concrete mixing truck dumps its unused, unset concrete onto this grid, which grid serves to break the force of the material hitting the upper reach 12 and helps to spread the material across the width of the bottom of the trough 20. A flexible flap 25 of heavy rubber cloth hangs from beam 24 with its lower edge contacting upper reach 12 and serves as a distributing bar for evening the depth of the material across the upper reach. The entire weight of the material, including the stones, sand and cement, is prevented from causing the upper reach 12 to sag by means of an idler roller 26 attached to frame 10 and engaging the lower surface of upper reach 12 and lying beneath the wire mesh 23. Downwardly directed spray nozzles 28 supported by feed water pipe 30 extend across trough 20 immediately following flap 25 for spraying wash water on the unset concrete. This wash water removes substantially all of the sand and cement from the stones, with the removed ingredients passing through the meshes of upper reach 12 and being carried off to the side of the machine by means of an inclined drain pan 34 attached to frame 10. Further movement of the conveyor belt brings the partly washed stones adjacent the discharge end of the upper reach. At this position are a pair of water nozzles 40 which are inclined downwardly toward upper reach 12 and directed obliquely at an angle of about 45° across the upper reach from opposite sides of the trough. These nozzles are supplied with water from a water feed pipe 42 and a branch pipe 44. The nozzle 40 has a slot-like vertically oriented outlet orifice, as shown in FIGURE 1, and the jets from nozzles 40 intersect across the upper reach 12 substantially immediately after the material passes from beneath the spray nozzles 28. These cross jets are directed against the direction of travel of stones on the belt and lift and tumble the stones so that the entire surfaces of the stones are washed and the sand and cement removed and drained through the upper reach. Further movement of the upper reach causes the stones to fall out the discharge end 46 of the conveyor.

In order to prevent stones from rolling off the longitudinal side edges of the upper reach 12, rubber belt sealing strips 50 are secured to the side walls 21 of the trough and have their lower edges riding on the upper surface of upper reach 12 inwardly from the longitudinal side edges of the upper reach. The lower edges of these sealing strips are held in engagement with the upper reach by means of looped leaf springs 52 spaced along the length of the trough and adjustably held by means of wing nuts 54 threaded to their respective bolts. This sealing strip is particularly important in the area where the stones are tumbled by the water jets coming from nozzles 40 inasmuch as these water jets tend to move the stones against the side walls 21 of the trough. Any stones dropping trough the meshes of the conveyor belt or falling off the upper reach which by chance drop on the upper surface of the lower reach 16 will be carried on the lower reach and caught between the conveyor belt and the roller 18. The stones will then stretch and distort the wire mesh conveyor belt. Such likelihood is initially and effectively prevented by the spring-pressed sealing strips 50.

The driving roller 14 is driven by a motor M through pulley P and reduction gear G.

Immediately in advance of belt return cylinder roller 18 is a flexible rubber belting stone scraper 60 attached to frame 10 by means of a pair of metal straps 62 and brackets 64 and 66, respectively. This scraper extends diagonally across the lower reach 16 and deflects any stones riding on the lower reach outwardly into drain pan 34. However, small stones caught in the meshes of the lower reach will not be swept off but will be carried around the roller 18. In order to remove these stones and thoroughly clean the wire mesh conveyor, this roller is covered by a resilient rubber lining 68. The small stones caught in the meshes will be held less tightly as the meshes open slightly while the wire mesh belt travels around the roller 18, and when the wire mesh belt reaches the upper reach 12, at which point the meshes become closed to their normal positions, the small stones are flipped downwardly out of the meshes. In order to prevent them from landing on the lower reach and repeating their journey around roller 18, a gutter 70 is positioned parallel to and immediately adjacent the roller 18. The small stones are caught in this gutter and washed out by means of water issuing from nozzle 72 connected to water feed pipe 30.

In operation, the motor M is started and the water nozzles turned on immediately before the truck dumps its concrete into trough 20, and the wire mesh conveyor belt runs continuously. As the concrete is dumped into the trough 20, the impact is initially absorbed by the grid 23 and the upper reach 12 of the belt kept from sagging by means of the idler roller 26. The concrete is quickly carried and distributed over the width of the trough by the flexible distributor flap 25, and immediately washed and freed of most of the sand and cement by the water sprays provided by the nozzles 28. The weight on the upper reach is thus promptly considerably reduced so that there is less tendency for the upper reach to sag. Even though the upper reach might sag slightly, the stones are kept from escaping from the trough by the sealing strips 50. The water jets from the nozzles 40 tumble the stones so that they are cleaned on all sides and the remaining sand and cement washed from the stones, while at the same time, the meshes of the conveyor belt are cleaned. On the lower reach 16 of the moving belt, any small stones not embedded in the meshes of the lower reach are removed by the scraper 60. The fine stones embedded in the meshes are flipped out as the belt reaches the upper reach 12 and carried away in gutter 70. As the belt starts moving along the upper reach, it is completely free of stones and the meshes are all open and undamaged. This stone cleaner will handle the unused and unset concrete as quickly at it is dumped from the truck and does not need any special operator other than the truck driver who starts up the machine.

Having now described the means by which the objects of the invention are obtained, we claim:

1. A stone washer comprising a frame, an endless open mesh conveyor belt having an upper reach, a lower reach, a stone receiving end and a stone discharging end mounted on said frame, grid and distributing means adjacent the stone receiving end of said belt for distributing stone evenly across said belt, first nozzle means mounted above said belt for spraying the stone with washing water as the stone is being moved by said belt, and second nozzle means adjacent the discharge end of said belt and directed downwardly and obliquely across said belt at an angle against the direction of movement of said belt for spraying and tumbling the stones on the belt immediately before the stones leave the discharging end of said belt.

2. A stone washer as in claim 1, further comprising a trough having inclined side walls mounted above the upper reach of said belt, sealing strips between said inclined walls and the surface of said upper reach, and spring means fastened to said side walls and bearing on said sealing strips for keeping said sealing strips in contact with said upper reach.

3. A stone washer as in claim 2, scraper means mounted above and engaging the upper surface of said lower reach for removing any stones caught by said lower reach.

4. A stone washer as in claim 3, further comprising a belt return roller at the inlet end of said conveyor belt, a resilient coating on said return roller, and gutter means between said upper and lower belt reaches and adjacent said return roller for catching small stones flipped out of the meshes of said conveyor belt as said belt enters its upper reach.

5. A stone washer as in claim 4, further comprising idler roller means beneath and engaging the lower surface of said upper reach and beneath said stone grid and distributing means for keeping said upper reach from sagging under the impact and weight of the stone dumped on said upper reach.

References Cited by the Examiner
UNITED STATES PATENTS

| | | | |
|---|---|---|---|
| 689,881 | 12/1901 | Hoy | 198—230 |
| 952,734 | 3/1910 | Haller | 134—104 X |
| 1,933,485 | 10/1933 | Rund | 198—230 |
| 2,172,471 | 9/1939 | Grow | 134—131 X |
| 2,612,896 | 10/1952 | Fox. | |
| 3,049,135 | 8/1962 | Kuhl | 134—72 |
| 3,082,774 | 3/1963 | Benton et al. | 134—63 |

CHARLES A. WILLMUTH, *Primary Examiner.*

G. NORTH, *Examiner.*

ROBERT L. BLEUTGE, *Assistant Examiner.*